July 25, 1967  G. ZOEHFELD  3,332,106
FOOD TOOL

Filed July 6, 1965  2 Sheets-Sheet 1

INVENTOR.
Gunther Zoehfeld
BY
*Yuter & Spiecens*
ATTORNEYS

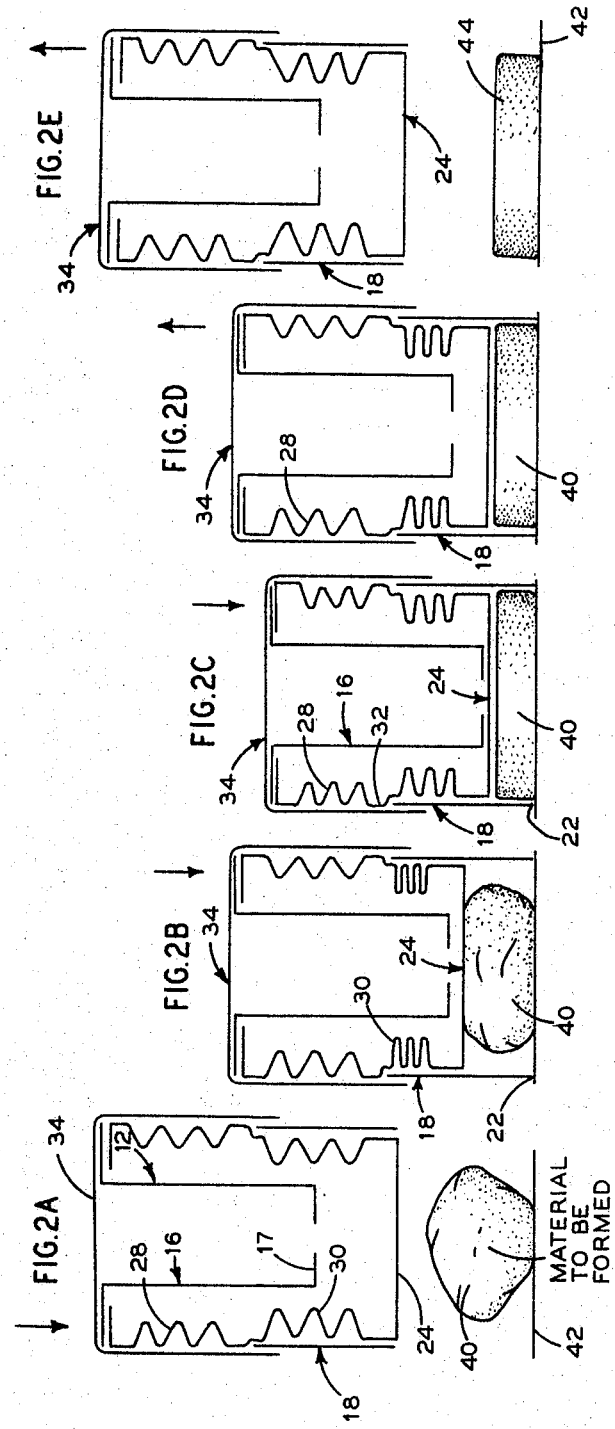

United States Patent Office 3,332,106
Patented July 25, 1967

3,332,106
FOOD TOOL
Gunther Zoehfeld, West Hurley, N.Y.
(305 Brittany Drive, Hurley Ridge, N.Y. 12443)
Filed July 6, 1965, Ser. No. 469,421
16 Claims. (Cl. 17—32)

ABSTRACT OF THE DISCLOSURE

There is provided a food patty former having a hand piece in the form of a hollow chamber with a covered end. A cylindrical sleeve member slidingly and telescopingly fits within the hand piece. A plunger slidingly fits within the sleeve member. A first spring operates between the hand piece and the sleeve member to urge the latter downward while a further spring operates between the sleeve member and the plunger to urge the latter outward. The strength of the springs is so chosen that when the patty former is placed on some ground food and pressed down onto the food, the plunger first recedes into the sleeve member before the sleeve member recedes within the handpiece.

---

This invention pertains to food tools and, more particularly, to an appliance for forming patties and the like.

Many foods are prepared in the form of patties. Typical foods are ground meat and fish which are served as hamburgers or fish cakes. In the institutional or mass processing of such foods as well as in the home, it is highly desirable to simply and easily make patties of uniform size and particularly of uniform cross-section. Individual hand forming of the patties is time consuming and does not lend itself to the production of uniform patties. Accordingly, many types of patty formers have been proposed. The first were of the cookie cutter type. However, these required rolling out the ingredients into sheets. More advanced formers provided molds of fixed volume. These molds required careful measuring of the starting mass. Otherwise, the mold did not completely fill, resulting in a non-uniform patty. Or else, the mold overflowed, resulting in a waste of material.

It is, therefore, a general object of the invention to provide an improved patty former.

It is another object of the invention to provide an improved food tool for forming patties quickly, easily and uniformly.

It is a further object of the invention to provide a food tool which can form a given amount of material into patties of uniform cross-section, but with a thickness which varies with the amount of material to be formed.

It is yet another object of the invention to provide a patty former which while satisfying the above objects is easy to operate, simple in construction and inexpensive to fabricate.

Briefly, the invention contemplates a patty former which comprises a hand piece having a top portion and a downwardly extending cylindrical portion. The user's hand presses on the top portion. There is further provided a forming sleeve member which is axially movable parallel to the cylindrical portion toward the top portion of the handpiece. The sleeve member has an outlet portion remote from the hand piece. A plunger is disposed within the sleeve member. The plunger is axially movable in a path of travel from at least the outlet portion toward the top portion of the hand piece. First spring means resist movement of the plunger from the outlet portion toward the top portion. And, second spring means resist movement of the sleeve member toward the top portion of the hand piece.

According to one aspect of the invention the first and second spring means are integrally connected while another aspect of the invention contemplates two separate spring means.

Other objects, and the features and advantages of the invention, will be apparent from the following detailed description when read together with the accompanying drawing which shows, by way of example and not limitation, several embodiments of the invention.

FIGURES 2A to 2E show a sequence of steps wherein the patty former of FIGURE 1 forms a patty.

Figure 1:
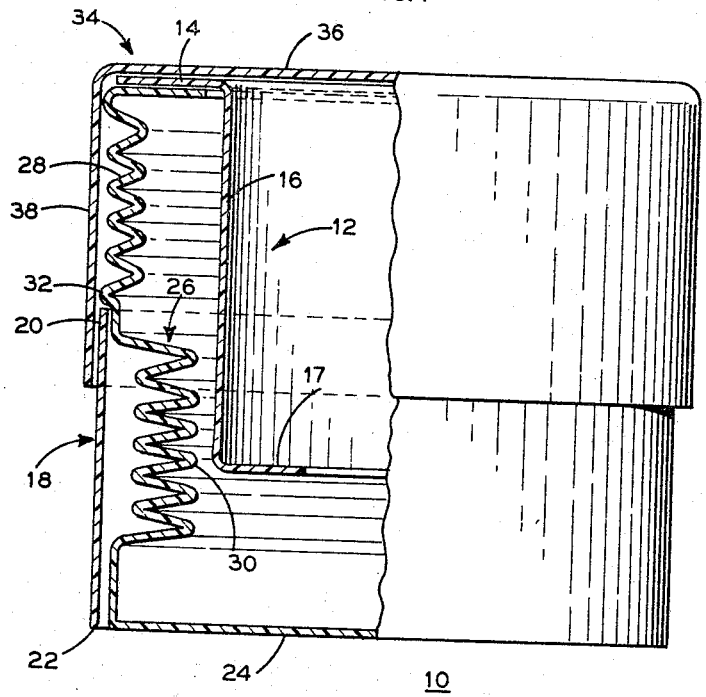
FIGURE 1 shows a vertical section of a patty former in accordance with one embodiment of the invention.

Referring now to FIGURE 1, the patty former 10 is shown comprising a hand piece 12 including a top portion in the form of a top flange 14 extending radially outward from the top end of a downwardly extending cylindrical portion 16. A radially inward flange 17 also extends from the bottom end of cylindrical portion 16. A forming sleeve member 18 having a top end 20 and a bottom end 22 is coaxially disposed with respect to the cylindrical portion 16 and is axially movable parallel to cylindrical portion 16. A plunger 24 is disposed coaxially within forming sleeve member 18 and is axially movable with respect thereto.

A compression spring member 26, in the form of an accordion-like cylinder, is coaxial with cylindrical portion 16 and is connected between the top flange portion 14 and the plunger 24. Preferably, plunger 24 is, as shown, integral with spring member 26. Spring member 26 comprises an upper spring means 28 and a lower spring means 30 separated by an intermediate portion 32. Intermediate portion 32 overrides the end 20 of forming sleeve member 18. Upper spring means 28 resists movement of sleeve member 18 toward the top of hand piece 12, and lower spring means 30 resists upward movement of plunger 24. It should be noted that the depth of the folds of lower spring means 30 is greater than those of upper spring means 28. Accordingly, upper spring means 28 exerts a greater resistance to compression than lower spring means 30.

Preferably, although not necessarily, the former 10 is provided with a cap member 34 comprising a top portion 36 connected to top flange portion 14 and a skirt portion 38 disposed about hand piece 16, upper spring means 28 and a portion of forming sleeve member 18. Cap member 18 not only is provided for esthetic reasons but also prevents a user's fingers from being pinched by the folds of upper spring member 28.

FIGURE 2 shows the patty former 10 in operation.

Initially, a measured quantity of material 40 to be formed is placed on a surface 42. Patty former 10 is positioned over the material 40 and then pushed downward (FIG. 2A). As the face of plunger 24 contacts the material 40, lower spring member 30 retracts while its resistance to compression starts flattening out the material 40 (FIG. 2B). This continues until the bottom end 22 of sleeve member 18 contacts surface 42. The instant of contact is shown in FIG. 2B. Further downward pressure on the handpiece 16 via cap member 34 (FIG. 2C) causes both a flattening of the substance 40 and the shaping of it into a patty having the shape corresponding to the chamber defined by the face of plunger 24, the surface 42 and the walls of forming sleeve member 18. The thickness of the patty is determined by the initial quantity of material 40.

Force transmitted through handpiece 16 to the back of plunger 24 causes material 40 to fill the chamber completely. At the same time, that force transmitted through upper spring means 28 and intermediate portion 32 to sleeve member 18 causes bottom end 22 to seal the chamber against surface 42.

As the patty former 10 is lifted, upper spring means 28 first expands and forming sleeve member 18 untelescopes from cap member 34 (FIG. 2D). Finally, after complete untelescoping, plunger 24 moves to the outlet portion of sleeve member 18, leaving a finished patty 44 on surface 42.

While the above described patty former 10 is ideally suited for fabrication with plastics, such as polyethylene, it is also possible to obtain a more rugged version utilizing metals or rugged synthetic materials.

Figure 3:
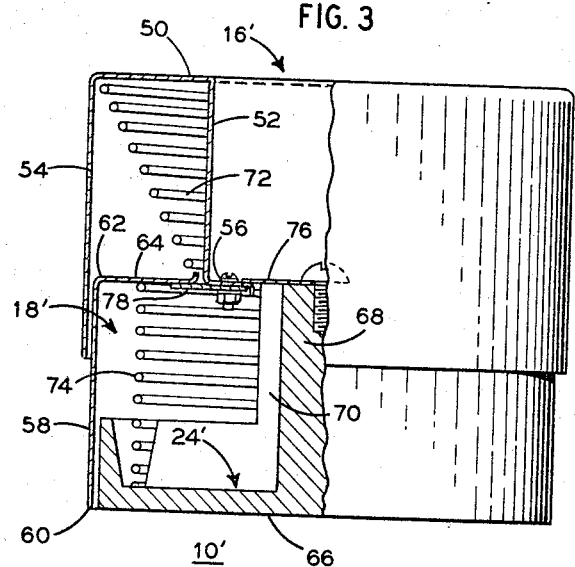
FIGURE 3 shows, in vertical section, an alternate embodiment of the patty former of FIGURE 1.

Accordingly, FIGURE 3 shows such an alternate embodiment. Patty former 10' includes a hand piece 16' which includes a top wall 50 and inner and outer side walls 52 and 54 which define an annular cylindrical chamber. Radially inwardly extending from the bottom of inner side wall 52 is a flange 56. A forming sleeve member 18' telescopingly movable in the annular cylindrical chamber of hand piece 16' comprises a cylindrical side wall portion 58 with top and bottom ends 62 and 60, and a top flange 64 extending radially inward from top end 62. A plunger 24' is coaxially disposed within forming sleeve member 18' and is axially movable with respect thereto. Plunger 24' includes a face portion 66, an upwardly extending axial portion 68 and stiffening ribs 70. An upper helical or conical compression spring 72 is disposed within the annular cylindrical chamber of hand piece 16' and abuts both top wall 50 thereof and the top flange 64 of forming sleeve member 18' to oppose the inward telescoping of member 18' into the hand piece 16'. A lower helical compression spring 74 is disposed within sleeve member 18' and abuts both the top flange 64 thereof and plunger 24'. Lower helical compression spring 74 resists upward movement of plunger 24'. Lower helical compression spring 74 is weaker than upper helical compression spring 72.

Plunger 24' can move axially upward against the force of spring 74 and its axial movement is guided by flange 56. However, downward travel of plunger 24' is restricted by the engagement of washer 76, affixed thereto, with flange 56. Similarly, sleeve member 18' can move upward against the force of spring 72. However, its downward travel is restricted by the engagement of retaining washer 78, affixed to flange 56, with the flange 64. Since the operation of patty former 10' is similar to the operation of patty former 10 of FIGURES 1 and 2, its operation will not be described.

There have thus been shown two embodiments of a patty former which by utilizing a pair of springs of different strength to control telescoping movement of a plunger and a forming sleeve member with respect to a hand piece produce patties of uniform shape having thicknesses in accordance with the amount of material initially selected.

It should be noted that while the cylindrical portions have been shown as having circular cross sections, other cross sections such as square, elliptical, heart shaped, pear shaped, etc., come within the purview of the invention. In fact, these latter shapes are desirable when the food tool is used to form cookies instead of meat patties.

While only two embodiments of the invention have been shown and described in detail, there will now be obvious to those skilled in the art many modifications and variations satisfying many or all of the objects of the invention, but which do not depart from the spirit thereof as defined in the appended claims.

What is claimed is:

1. A patty former comprising a hand piece including a top portion upon which a hand is to be placed and a downwardly extending cylindrical portion, a forming sleeve member axially movable parallel to said cylindrical portion toward said top portion, said sleeve member including an outlet portion remote from said hand piece, a plunger within said sleeve member and axially movable at least from said outlet portion toward the top portion of said hand piece, first spring means for resisting movement of said plunger from said outlet portion toward said top portion, and second spring means for resisting movement of said sleeve member toward said top portion.

2. A patty former comprising a hand piece including a top portion upon which a hand is to be placed and a downwardly extending cylindrical portion, a forming sleeve member axially movable parallel to said cylindrical portion toward said top portion, said sleeve member including an outlet portion remote from said hand piece, a plunger within said sleeve member and axially movable at least from said outlet portion toward the top portion of said hand piece, first spring means for resisting movement of said plunger from said outlet portion toward said top portion, and second spring means for resisting movement of said sleeve member toward said top portion, said first spring means being weaker than said second spring means so that when said plunger is placed against a plastic mass resting on a surface and a downward force is applied to said hand piece, said plunger moves in said sleeve member toward the top portion of said hand piece until the outlet portion of said sleeve member contacts the surface and thereafter said plunger and said sleeve member simultaneously move toward said top portion.

3. A patty former comprising a hand piece including a top portion upon which a hand is to be placed and a downwardly extending cylindrical portion, a forming sleeve member axially movable parallel to said cylindrical portion toward said top portion, said sleeve member including an outlet portion remote from said hand piece and an abutment portion, a plunger within said sleeve member and axially movable at least from said outlet portion toward the top portion of said hand piece, first spring means for resisting movement of said plunger from said outlet portion toward said top portion, and second spring means abutting the top portion of said hand piece and the abutment portion of said sleeve member for resisting movement of said sleeve member toward said top portion.

4. A patty former comprising a hand piece including a top portion upon which a hand is to be placed and a downwardly extending cylindrical portion, a forming sleeve member axially movable parallel to said cylindrical portion toward said top portion, said sleeve member including an outlet portion remote from said hand piece, a plunger within said sleeve member and axially movable at least from said outlet portion toward the top portion of said hand piece, axial spring means at least abutting said plunger for resisting movement of said plunger from said outlet portion toward said top portion, and second spring means for resisting movement of said sleeve member toward said top portion.

5. A patty former comprising a hand piece including a top portion upon which a hand is to be placed and a downwardly extending cylindrical portion, a forming sleeve member axially movable parallel to said cylindrical portion toward said top portion, said sleeve member including an outlet portion remote from said hand piece and an abutment portion, a plunger within said sleeve member and axially movable at least from said outlet portion toward the top portion of said hand piece, first axial spring means at least abutting said plunger for resisting movement of said plunger from said outlet portion toward said top portion, and second spring means for resisting movement of said sleeve member toward said top portion.

6. A patty former comprising a hand piece including a top portion upon which a hand is to be placed and a downwardly extending cylindrical portion, a forming sleeve member axially movable parallel to said cylindrical portion toward said top portion, said sleeve member including an outlet portion remote from said hand piece and an abutment portion, a plunger within said sleeve member and axially movable at least from said outlet portion toward the top portion of said hand piece, first axial spring means at least abutting said plunger for resisting movement of said plunger from said outlet portion toward said top portion, and second spring means for resisting movement of said sleeve member toward said top portion, said first axial spring means being weaker than said second axial spring means so that when said plunger is placed against a plastic mass resting on a surface and a downward force is applied to said hand piece said plunger moves in said sleeve member toward the top portion of said hand piece until the outlet portion of said sleeve member contacts the surface and thereafter said plunger and said sleeve member simultaneously move toward said top portion.

7. A patty former comprising: a hand piece including a cylindrical portion having top and bottom ends, and a top flange portion extending radially outward from the top end of said cylindrical portion; a forming sleeve member coaxial with the cylindrical portion of said hand piece and movable parallel to said cylindrical portion, said forming sleeve member including first and second ends wherein said first end is closer to the top portion of said hand piece; a plunger coaxially disposed and axially movable within said forming sleeve member; and an axial compression spring member coaxial with the cylindrical portion of said hand piece and connected between the flange portion of said hand piece and said plunger, an intermediate portion of said spring member engaging a portion of said forming sleeve member, the portion of said spring member between said intermediate portion and the portion connected to said flange portion having a stronger resistance to compression than the portion between said intermediate portion and the portion connected to said plunger.

8. The patty former of claim 7 wherein said plunger is integral with said spring member.

9. The patty former of claim 7 wherein the intermediate portion of said spring member overrides the first end of said forming sleeve member.

10. The patty former of claim 7 wherein said spring member is an accordion-like cylinder.

11. The patty former of claim 7 wherein said hand piece includes a bottom flange portion extending radially inward from the bottom end of said cylindrical portion to provide a stop for said plunger.

12. The patty former of claim 7 further comprising a cap member including a top portion resting on the top flange portion of said hand piece and a skirt portion disposed about said hand piece, a portion of said spring member, and a portion of said forming sleeve member.

13. A patty former comprising: a hand piece in the form of an annular cylinder including inner and outer side walls and a top wall providing an annular cylindrical chamber; a forming sleeve member including a cylindrical side wall portion having top and bottom ends and a top flange extending radially inward from the top end of said cylindrical side wall, said forming sleeve member being axially movable within said annular cylindrical chamber; a plunger coaxially disposed within said forming sleeve member and axially movable with respect thereto; a first helical compression spring disposed within the annular cylindrical chamber and abutting the top wall of said hand piece and the top flange of said forming sleeve member; and a second helical compression spring disposed within said forming sleeve member and abutting the top flange of said forming sleeve member and said plunger; the compresisvce force of said first helical compression spring being greater than the compressive force of said second helical compression spring.

14. The patty former of claim 13 wherein said plunger includes a face portion and an upwardly extending axial portion, and wherein the inner side wall of said hand piece includes an inwardly extending flange for guiding axial travel of the axial portion of said plunger.

15. The patty former of claim 14 further comprising means for causing the inwardly extending flange of said inner side wall and the axial portion of said plunger to engage for limiting downward travel of the latter.

16. The patty maker of claim 14 further comprising means overhanging the top of said axial portion for engaging the inwardly extending flange of said inner side wall to limit downward travel of said plunger and means radially outwardly extending for the inwardly extending flange of said inner side wall for engaging the top flange of said forming sleeve member to limit downward travel of the latter.

References Cited
UNITED STATES PATENTS

| | | | |
|---|---|---|---|
| 737,452 | 8/1903 | Needles | 31—11 |
| 1,183,731 | 5/1916 | Hopkins. | |
| 1,422,112 | 7/1922 | Lord. | |
| 2,641,094 | 6/1953 | Starzyk | 17—32 X |
| 3,026,562 | 3/1962 | Bania | 17—32 |

LUCIE H. LAUDENSLAGER, *Primary Examiner.*